Figure 1:
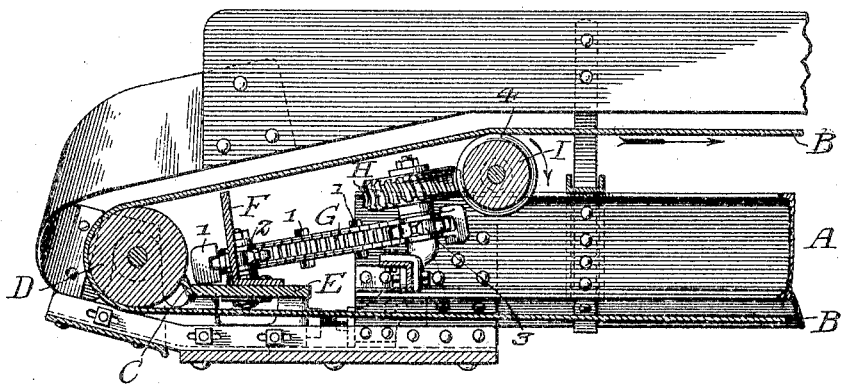

No. 789,628. PATENTED MAY 9, 1905.
B. O. RHODES.
ELEVATING CARRIER FOR GRADING AND DITCHING MACHINES.
APPLICATION FILED FEB. 10, 1904.

2 SHEETS—SHEET 1.

Witnesses:
Louis H. F. Whitehead
Ottilie C. Freiberg

Inventor:-
Bert O. Rhodes
by:- Chas. L. Page
Attorney

No. 789,628. PATENTED MAY 9, 1905.
B. O. RHODES.
ELEVATING CARRIER FOR GRADING AND DITCHING MACHINES.
APPLICATION FILED FEB. 10, 1904.
2 SHEETS—SHEET 2.
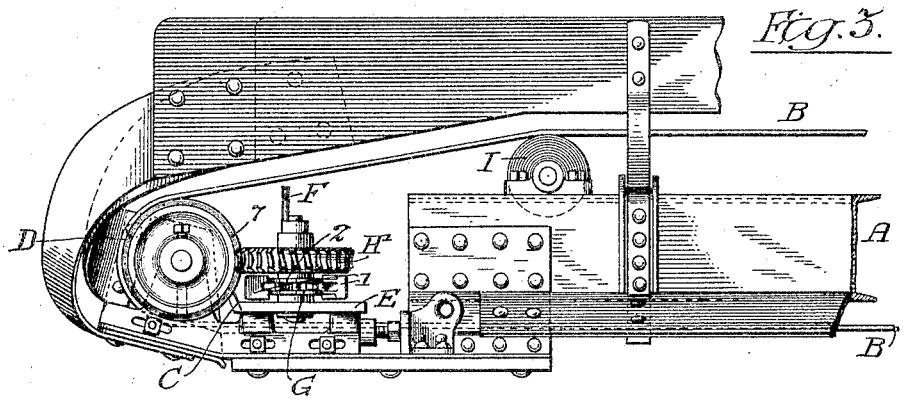
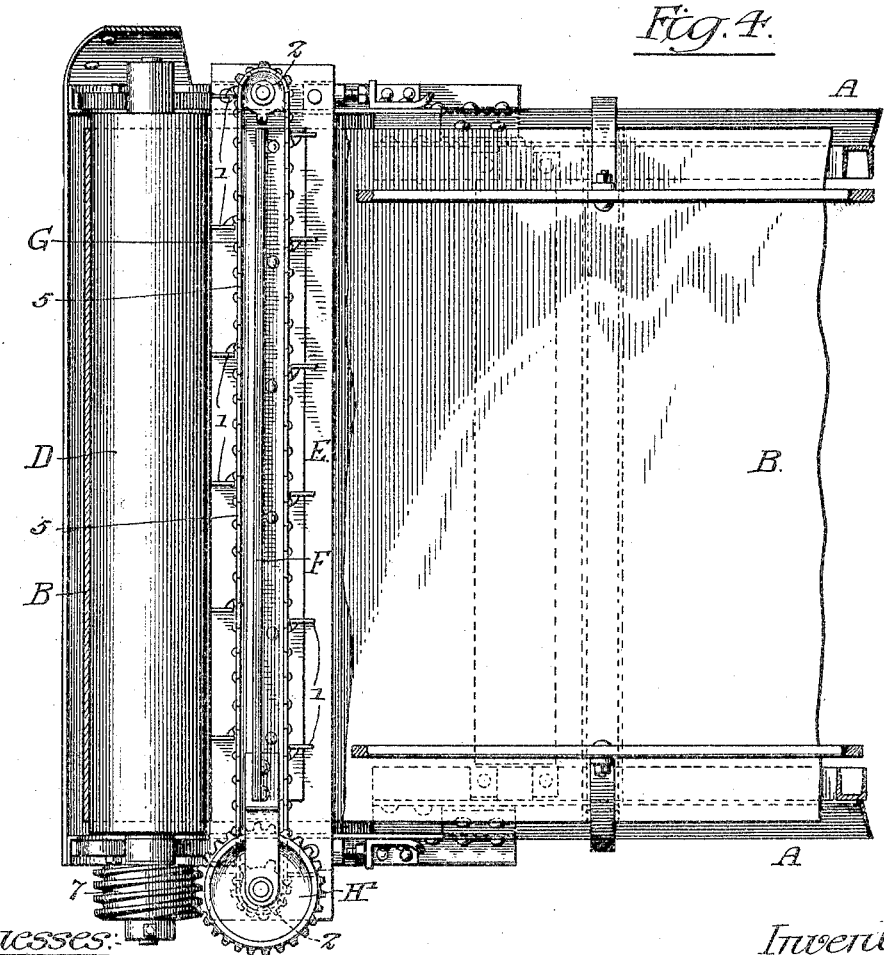
Witnesses:
Louis M. Whitehead
Ottilie C. Freiberg
Inventor:-
Bert O. Rhodes
by:- Chas. L. Page
Attorney No. 789,628.

Patented May 9, 1905.

UNITED STATES PATENT OFFICE.

BERT O. RHODES, OF BARBERTON, OHIO, ASSIGNOR TO NATIONAL DRILL AND MANUFACTURING COMPANY, OF CHICAGO, ILLINOIS, A CORPORATION OF WEST VIRGINIA.

ELEVATING-CARRIER FOR GRADING AND DITCHING MACHINES.

SPECIFICATION forming part of Letters Patent No. 789,628, dated May 9, 1905.

Application filed February 10, 1904. Serial No. 192,992.

*To all whom it may concern:*

Be it known that I, BERT O. RHODES, a citizen of the United States, residing at Barberton, in the county of Summit and State of Ohio, have invented certain new and useful Improvements in Elevating-Carriers for Grading and Ditching Machines, of which the following is a specification.

My invention relates to elevating-carriers for grading and ditching machines in which the elevating-carrier involves an endless belt passing about a number of belt-rolls upon a suitable frame, the endless carrier being arranged to receive the soil from the plow, as illustrated, for example, in Letters Patent No. 743,487 to Thomas J. Gray, November 10, 1903. In these machines it is very common for soil loosened up by the plow to find its way in between the upper and lower leaves of the carrier-belt, and when such soil is sticky it is carried by the belt to the roll at the receiving end of the carrier, where it will adhere to such belt-roll. As illustrated in said patent, the soil which thus adheres to the belt-roll at the receiving end of the elevating-carrier is removed from such belt-roll by a scraper, which directs the scraped-off soil upon what is commonly known as a "pen" or "shelf," the soil thus deposited upon the shelf being in said patent removed by an endless transversely-arranged chain having its lower leaf arranged to sag below the elevating-carrier, so that its scraper-teeth will engage the ground, and thereby cause the chain to be operated during the advancement of the machine. I find, however, that in practice the operations of such scraping-chain are not reliable, owing to the variations in the ground-surface, a further disadvantage being that it is sometimes desirable to vary the height of the elevating-carrier, and in such case it is not practical to correspondingly adjust the scraping or cleaning chain. A further disadvantage is that when the chain thus engages in the ground it is liable to take up an objectionable quantity of soil.

Objects of my invention are to entirely overcome said defects and objectionable features and to operate the scraping or cleaning chain or belt in a more effective and desirable way.

Figure 2:
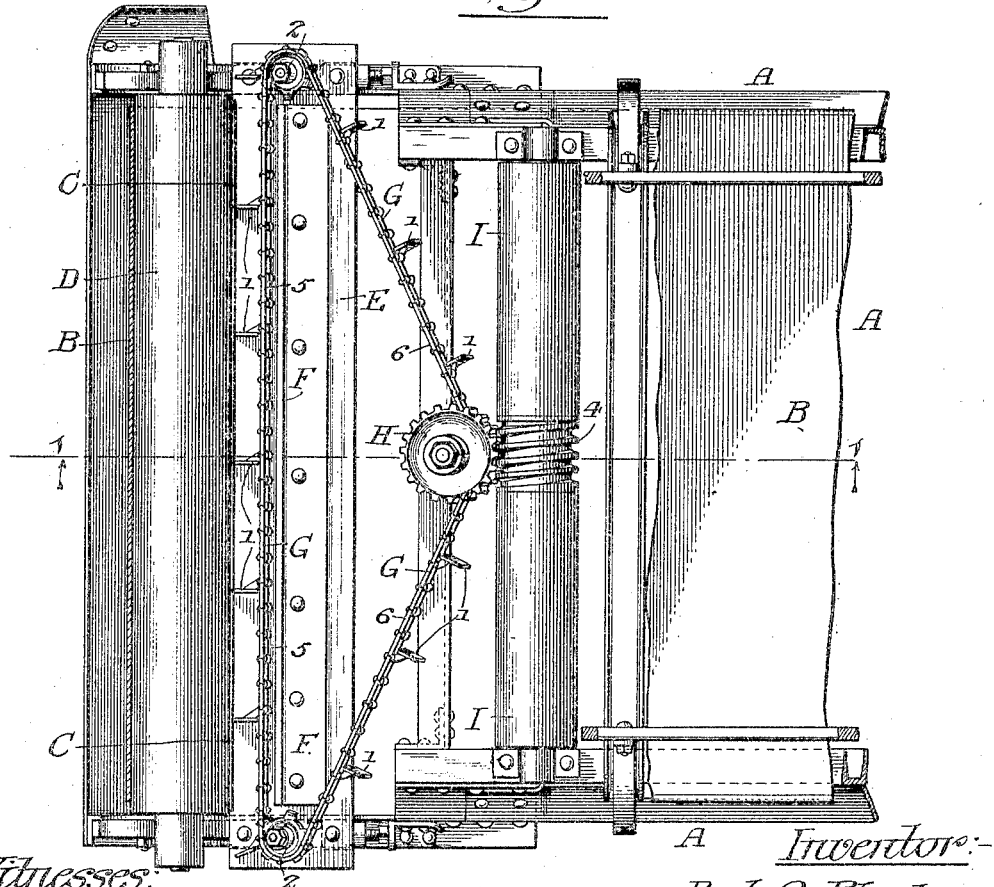

In the accompanying drawings, Figure 1 is a longitudinal section on a vertical central plane through the receiving end portion of the elevating-carrier involving the principles of my invention. Fig. 2 is a top plan view of such receiving end portion of the elevating-carrier with the belt broken away. Fig. 3 is a view similar to Fig. 1, showing a slight change in the driving connection for the endless chain or belt. Fig. 4 is a top plan view of Fig. 3 with the carrier-belt broken away.

The elevating-carrier frame A can be constructed substantially as in said patent to Gray or in any other known or approved manner, and, as usual, it is provided with belt-rolls for the endless carrier-belt B.

C indicates a scraper which serves to scrape the soil from the usual belt-roll D at the receiving end of the elevating-carrier, and E indicates a transversely-arranged pan or shelf supported upon the frame of the elevating-carrier and arranged to receive the loose soil from the scraper C.

F indicates an upright scraper-plate arranged back of the scraper C and conveniently formed by an angle-plate secured upon the shelf E.

In Figs. 1 and 2 the endless cleaner chain or belt G, having a suitable number of projecting scrapers or wipers 1, is arranged to pass about sprockets 2, which are respectively at opposite sides of the main frame and conveniently arranged upon or over the shelf E. A chain or belt G also passes about and is driven by a sprocket 3, arranged below and upon the axle of a worm-wheel H, which in turn engages with and is driven by a worm 4 on one of the idler belt-rolls I, which serves to support the upper leaf of the elevating-carrier belt at a point back of the belt-roll D. During operation, therefore, the idler-roll I is driven by frictional contact with the belt B, and when thus operated it serves to drive the cleaner-belt G. With this arrangement of cleaner-belt its wipers or scrapers 1 can and do project from the said belt G in a plane parallel or substantially parallel with the shelf E, so that the leaf of the belt G which is adjacent to the scraper C and which traverses the shelf E in a right line between the sprockets 2 will have its wipers 1 arranged to scrape the top surface of the shelf E, as in Figs. 1 and 2, and thereby effectively remove all loose soil therefrom. As a preferred arrangement the scraper F is arranged to extend between the two leaves 5 and 6 of the cleaner-belt G, the leaf 5 of such cleaner-belt being with such arrangement just forward of and parallel with the scraper F, so that the wipers 1 on the belt-leaf 5 will project from such belt-leaf forwardly toward the scraper C. In this way the scraper F, the scaper C, and the intervening portion of the shelf E combine to form a trough having a flat bottom and adapted to receive leaf 5 of the cleaner-belt G, which as arranged causes its wipers to extend substantially from side to side of the trough and to traverse the bottom with which said trough is provided.

While the idler-roll I may revolve at a rate of speed commensurate with the travel of the endless carrier-belt B, the travel of the cleaner-belt G will not be so rapid, by reason of its worm-gear connection with the roll I, thereby greatly saving in wear and tear.

In Figs. 3 and 4 the cleaner-belt is provided with wipers 1 and trained about the sprockets 2; but in place of driving it from the roll I it is operated by one of the sprockets 2, which is secured upon or made suitably rigid with the axle of a worm-wheel H', arranged to engage a worm 7 upon the roll D at the receiving end of the elevating-carrier. With this arrangement the cleaner-belt G is suitably shortened so that its two leaves will be parallel with and respectively at opposite sides of the scraper F, it being observed that the belt-leaf 5 traverses the forward portion of the shelf E and that the wipers thereon traverse a trough substantially as hereinbefore described in connection with preceding figures. In said Patent No. 743,487 the teeth on the wiper-belt are necessarily in a plane perpendicular, or substantially so, to the plane of the shelf or pan. In my improvement, however, the teeth or wipers 1 are parallel or substantially parallel with the plane of the pan or shelf E, and therefore more effectively operate as means for carrying off the loose soil.

In both of the arrangements herein shown the wiper-belt G is between the upper and lower leaves of the endless carrier-belt B, and therefore out of the way and protected.

It will also be observed that in Fig. 1 the teeth or wipers 1 on the cleaner-belt leaf 5 are quite close to the roll D and that they will effectively take loose soil from said roll.

What I claim as my invention is—

1. In an elevating-carrier for grading and ditching machines, an endless elevating-carrier belt and belt-rolls therefor; and a cleaning device constructed with an endless cleaning-belt arranged between the upper and lower leaves of the elevating-carrier belt, and power-transmitting connection between one of the rolls for the elevating-carrier belt and the cleaning-belt.

2. In an elevating-carrier for grading and ditching machines, an endless elevating-carrier belt and belt-rolls therefor; and a cleaning device constructed with an endless cleaning-belt arranged between the upper and lower leaves of the elevating-carrier belt, and power-transmitting connection arranged between one of the rolls for the elevating-carrier belt and the cleaning-belt and involving a worm-gear.

3. In an elevating-carrier for grading and ditching machines constructed with an endless elevating-carrier belt and belt-rolls therefor; a scraper for removing soil from one of the belt-rolls; a shelf arranged to receive the soil scraped from said roll; an endless cleaner-belt arranged with its two leaves between the upper and lower leaves of the elevating-carrier belt and supported to traverse the bed and having projecting wipers which project laterally therefrom and sweep the bed from side to side of the elevating-carrier during the travel of the cleaner-belt; and driving means for operating the cleaner-belt.

4. In an elevating-carrier for grading and ditching machines, an endless elevating-carrier belt; a belt-roll for said belt at the receiving end of the elevating-carrier; a scraper for removing soil from such belt-roll; a shelf arranged to receive soil thus scraped from the belt-roll; a scraper F rising from the shelf toward the upper leaf of the elevating-carrier belt; an endless cleaner-belt having wipers and supported for travel with one leaf between the two scrapers and the other leaf back of the scraper F; and means for operating the cleaner-belt; the wipers on the cleaner-belt being arranged to sweep the shelf between the two scrapers during the travel of such belt.

BERT O. RHODES.

Witnesses:
S. E. FREEMAN,
O. D. EVERHARD.